United States Patent
Lenzing et al.

(10) Patent No.: US 6,820,488 B2
(45) Date of Patent: Nov. 23, 2004

(54) FIBER-OPTIC PRESSURE SENSOR

(75) Inventors: Thomas Lenzing, Benningen (DE); Uwe Konzelmann, Asperg (DE)

(73) Assignee: Robert Bosch GmbH, Stuttgart (DE)

( * ) Notice: Subject to any disclaimer, the term of this patent is extended or adjusted under 35 U.S.C. 154(b) by 1 day.

(21) Appl. No.: 10/459,362

(22) Filed: Jun. 10, 2003

(65) Prior Publication Data

US 2004/0031326 A1 Feb. 19, 2004

(30) Foreign Application Priority Data

Jun. 11, 2002 (DE) .......................................... 102 25 934

(51) Int. Cl.⁷ ................................................ G01L 9/00
(52) U.S. Cl. ......................................... 73/705; 385/12
(58) Field of Search ........................ 73/715, 705, 712; 385/12; 216/24

(56) References Cited

U.S. PATENT DOCUMENTS

| | | | | |
|---|---|---|---|---|
| 4,487,206 A | * | 12/1984 | Aagard | 600/480 |
| 4,620,093 A | * | 10/1986 | Barkhoudarian et al. | 250/231.19 |
| 4,787,396 A | * | 11/1988 | Pidorenko | 600/480 |
| 5,275,053 A | * | 1/1994 | Wlodarczyk et al. | 73/705 |
| 5,385,053 A | * | 1/1995 | Wlodarczyk et al. | 73/705 |
| 5,425,273 A | * | 6/1995 | Chevalier | 73/705 |
| 5,600,070 A | * | 2/1997 | Wlodarczyk | 73/715 |
| 6,131,465 A | | 10/2000 | Wlodarczyk et al. | |
| 6,506,313 B1 | * | 1/2003 | Fetterman et al. | 216/24 |
| 6,597,820 B1 | * | 7/2003 | Sheem | 385/12 |
| 6,738,537 B2 | * | 5/2004 | Sheem | 385/12 |
| 2003/0138185 A1 | * | 7/2003 | Dianov et al. | 385/12 |

FOREIGN PATENT DOCUMENTS

DE      40 18 998      1/1992

* cited by examiner

Primary Examiner—Edward Lefkowitz
Assistant Examiner—Andre Allen
(74) Attorney, Agent, or Firm—Kenyon & Kenyon

(57) ABSTRACT

A fiber-optic pressure sensor having a pressure measuring head including a housing which accommodates a diaphragm functioning as a pressure transducer and completing a translational movement under applied pressure and including at least one optical waveguide, the face of which is directed to the inside surface of the diaphragm and via which the light emitted by a light source is introduced into the pressure measuring head, the inside diaphragm surface having a pattern of highly reflective areas and areas of low reflectivity.

11 Claims, 3 Drawing Sheets

FIBER-OPTIC PRESSURE SENSOR

FIELD OF THE INVENTION

In fiber-optic sensor systems, an optical electromagnetic wave guided by total reflection in an optical waveguide is used as an information carrier. In a sensing element, an optical effect modulates the light as a function of the measured variable to be detected, e.g., the pressure. Advantages of such sensors are small size, high resolution, high interference immunity to electromagnetic radiation, electrical isolation, and the possibility of constructing multisensor systems from them. Fiber-optic systems are consequently ideal for use in explosion hazard areas, in areas having high electromagnetic radiation and in medicine.

BACKGROUND INFORMATION

A known fiber-optic pressure sensor is known under the name of Fabry-Perot pressure sensor. It uses a miniature gap system including a pressure-sensitive diaphragm as a sensing element. The resonator gap is delimited by two semi-reflective mirrors. The outer mirror is designed as a diaphragm. From the point of view of interference optics, the gap is a low-quality Fabry-Perot resonator, which partially reflects light. The reflection spectrum is periodically modulated. The spectral positions of the interference minima and maxima or the period intervals depend on the gap width and on the diaphragm deflection. A fiber-optic pressure sensor based on this measuring principle is known, for example, from German Patent Application No. 40 18 998. The change in the interference pattern is detected and evaluated in a complicated manner using a spectral measuring instrument and associated analytical methods.

Another fiber-optic pressure sensor known from the related art includes a pressure measuring head also having a diaphragm functioning as a pressure transducer that completes a translational movement under applied pressure, the diaphragm having a highly reflective, metallized inside diaphragm surface. When pressure is applied, the diaphragm is deflected inwards into the pressure measuring head, as a result of which the angle of incidence of the light beams emerging from an optical waveguide onto the diaphragm is changed. This change of the angle of incidence results in a change of the reflection angle and consequently a reduction of the amount of light reflected back into the optical waveguide. The ratio of the light intensity emerging from the optical waveguide to the light intensity reflected into the optical waveguide and picked up by the inside diaphragm surface is a measure of the pressure acting on the diaphragm. In this measuring principle, which is simplified compared to the one cited first, the pressure determination requires only that the light intensity reflected back into the optical waveguide be measured. A fiber-optic pressure sensor of this type is known, for example from U.S. Pat. No. 6,131,465, it being integrated into a spark plug. However, this design of a fiber-optic pressure sensor has the disadvantage that a large sensor diaphragm displacement is required to detect the pressure based on the changes in intensity.

SUMMARY OF THE INVENTION

The fiber-optic pressure sensor of the present invention avoids the disadvantages evident in the related art and makes it possible to measure pressure with only a slight diaphragm deflection being required. Among other things, this results in a lower sensitivity of the sensor to contamination of the diaphragm. In addition, compared to the above-described Fabry-Perot pressure sensor in particular, it has considerable advantages with regard to costs and complexity of assembly and production.

According to the present invention, these advantages are attained by a fiber-optic pressure sensor having a pressure measuring head including a housing in which a diaphragm is mounted functioning as a pressure transducer that completes a translational movement under applied pressure and having at least one optical waveguide, the end face of which is directed to the inside diaphragm surface and via which the light emitted by a light source is introduced into the pressure measuring head, the inside diaphragm surface having a pattern of highly reflective areas and areas of low reflectivity.

The fiber-optic pressure sensor according to the present invention is based on the principle of light intensity measurement. The light emitted by a light source is introduced into the pressure measuring head via an optical waveguide, reflected by the inside diaphragm surface and a portion of the reflected light is picked up by the same or another optical waveguide and introduced into a detector. The detector measures the intensity of the light reaching it. The intensity picked up by the detector changes as a function of the deflection of the diaphragm. Depending on the configuration of the components of the pressure measuring head, the intensity change is a reduction or an increase in the intensity relative to the measured intensity without applied pressure. The pressure is determined using an intensity-pressure characteristic, which indicates the relation between the intensity measured by the detector and the ratio of the measured intensity to the intensity beamed by the light source and the pressure present at the pressure measuring head.

Due to the patterned inside diaphragm surface, even a small deflection of the sensor diaphragm results in a measurable intensity reduction of the light reflected back into the optical waveguide. In the pressure sensor of the present invention, a curvature of the diaphragm causes a change in the incidence—and therefore in the angle of reflection for the light reflected onto the highly reflective areas and in addition an enlargement of the areas of low reflectivity. The result of these two effects is a large intensity reduction of the light reflected in the direction of the optical waveguide even when there is only a slight curvature of the diaphragm.

The areas of low reflectivity may be, for example, cuts or indentations in the inside diaphragm surface. In order to produce such inside surfaces of the diaphragms having cuts or indentations, a laser may be used to burn in the cuts or indentations in a diaphragm having a polished or coated highly reflective surface.

Moreover, the areas of low reflectivity may be delustered areas on the inside diaphragm surface. In order to produce such inside surfaces of the diaphragm having delustered areas, the polished or coated highly reflective surface of the diaphragm may be delustered chemically or mechanically in the desired areas.

The highly reflective areas have a reflectivity $\geq 0.5$, preferably $\geq 0.8$. The areas of low reflectivity have a reflectivity below 0.5, preferably below 0.3.

A further object of the present invention is a spark plug for a spark-ignition internal combustion engine having a built-in pressure sensor according to the present invention, the pressure measuring head being positioned at the one end of the spark plug in such a way that the diaphragm is directly exposed to the pressure in a cylinder of the internal combustion engine. The continuous monitoring of the pressure in internal combustion engines makes a significant improvement in engine efficiency, performance and reliability possible. In addition, it is possible to reduce the operating costs and the undesirable emissions of the internal combustion engine.

The spark plug according to the present invention having the fiber-optic pressure sensor permits the monitoring of each cylinder of the internal combustion engine for knock or misfiring, making it possible to recognize and eliminate these malfunctions. Among other things, the exclusive use of high-temperature resistant materials in the pressure measuring head makes it possible to use the fiber-optic pressure sensor according to the present invention in the spark plug. In addition, even small deflections of the diaphragm of the fiber-optic pressure sensor according to the present invention are sufficient to obtain a measurable and meaningful signal. For that reason, it is possible to manufacture the pressure sensor according to the present invention and its diaphragm in particular to have the stability and robustness necessary for use in the spark plug, and it is less susceptible to contamination, e.g., by soot.

A further object of the present invention is an injector for an internal combustion engine having at least one built-in fiber-optic pressure sensor according to the present invention for measuring the pressure in the combustion chamber of the internal combustion engine and/or the fuel pressure. The advantages of pressure monitoring by the spark plug/pressure sensor combination cited above for spark-ignition internal combustion engines are also applicable to the monitoring of direct injection engines by at least one pressure sensor according to the present invention, which is integrated in the injector. In this case, for example, two pressure sensors according to the present invention may also be integrated in the injector, one for monitoring the static fuel pressure in the injector and the other for monitoring the dynamic combustion chamber pressure.

An additional possible installation site for the pressure sensor according to the present invention is the combustion chamber itself. Pressure measurement using the sensor according to the present invention is also conceivable in jet turbine engines for aircraft or in the gas turbines of gas-fired power stations.

DETAILED DESCRIPTION

Figure 1:
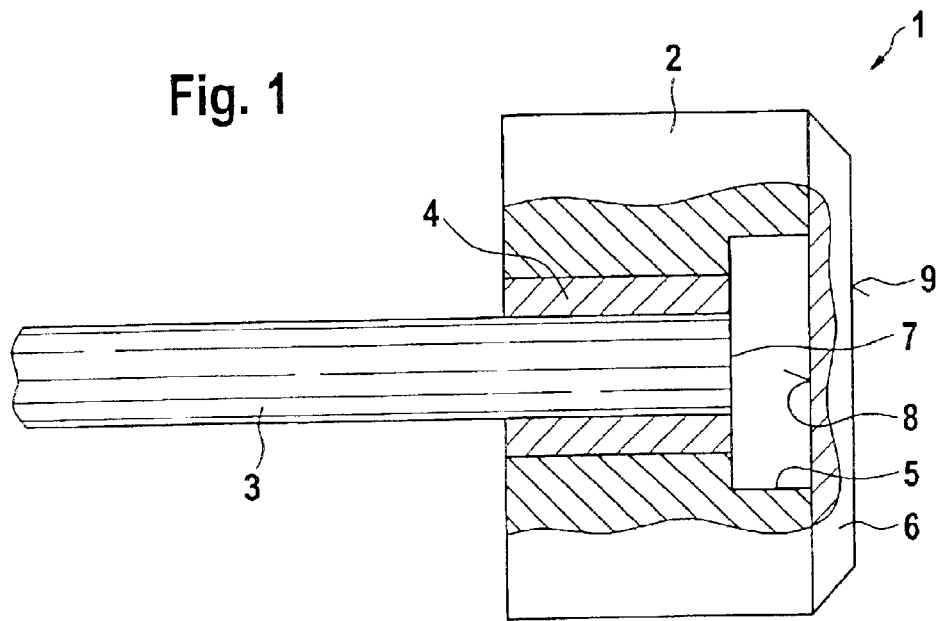
FIG. 1 shows the schematic construction of the measuring head of a fiber-optic pressure sensor according to the present invention having an optical waveguide.

FIG. 1 shows the schematic construction of the pressure measuring head in one embodiment of the fiber-optic pressure sensor according to the present invention.

Pressure measuring head 1 has a housing 2. An optical waveguide 3 is secured in housing 2, a sleeve 4 enclosing end 7 of optical waveguide 3. A cavity 5 separates end 7 of optical waveguide 3 from diaphragm 6. The inside surface 8 of the diaphragm facing cavity 5 and optical waveguide 7 has, according to the present invention, a pattern (not shown) of highly reflective areas and areas of low reflectivity. Light from a light source (not shown) is introduced into pressure measuring head 1 by optical waveguide 3. At end 7 of optical waveguide 3, the light is beamed into cavity 5 and is partially reflected on patterned inside surface 8 of the diaphragm. The reflected light is in turn partially injected into optical waveguide 3 and guided through it to a detector (not shown). Outside surface 9 of diaphragm 6 is exposed to the pressure to be measured. An increase in pressure causes diaphragm 6 to be deflected into cavity 5. Inside surface 8 of the diaphragm is curved as consequence of a pressure increase so that the angle of reflection for the light reflected on the inside diaphragm surface is changed. Consequently, this diminishes the amount of the beamed light which is again injected into optical waveguide 3 after the reflection and reaches the detector. The intensity of the light reaching the detector relative to the intensity of the light beamed in is correlated with the pressure acting on the outside surface 9 of the diaphragm. In this embodiment of the present invention, the one optical waveguide 3 is used as an input and output optical waveguide, through which both the light beamed into pressure measuring head 1 as well as a portion of the light reflected away from measuring head 1 is guided.

Figure 2:
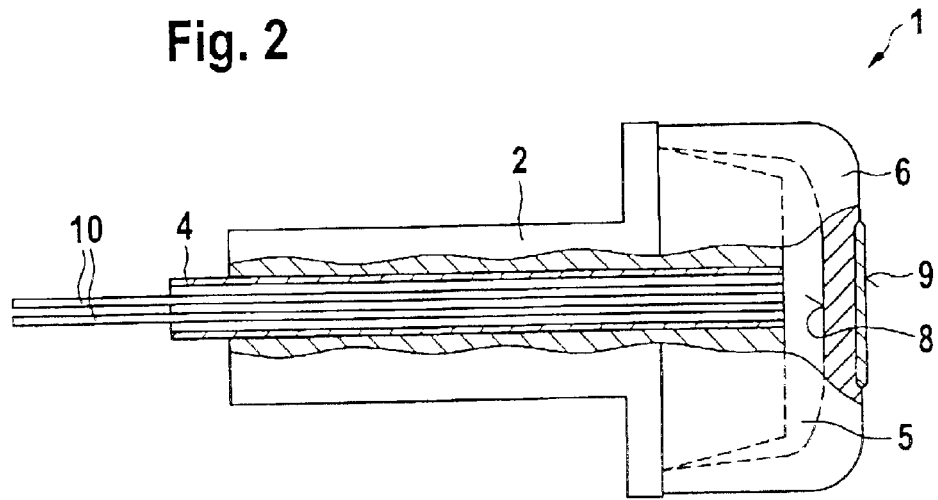
FIG. 2 shows the schematic construction of the measuring head of a fiber-optic pressure sensor according to the present invention having an input and an output optical waveguide.

FIG. 2 shows the schematic construction of the pressure measuring head in another embodiment of the fiber-optic pressure sensor of the present invention.

Basically, the construction of pressure measuring head 1 shown in FIG. 2 corresponds to that of FIG. 1. It includes a housing 2, a diaphragm 6 and an adjoining cavity 5. According to the present invention, inside surface 8 of diaphragm 6 has a pattern (not shown) of areas of high and low reflectivity. In this embodiment, diaphragm 6 is hat-shaped and welded to housing 2.

In the present invention, the diaphragm preferably contains at least one of the following materials: a metallic material (e.g., stainless steel, Remanit® or platinum) a semiconductor material (e.g., silicon) or silicon nitride. Remanit® is the designation for a group of 40 non-rusting steels (Thyssen Edelstahlwerke AG, Krefeld, Germany) and has the advantage of low thermal expansion and high corrosion resistance. Silicon nitride also has low thermal expansion in addition to a high modulus of elasticity and low weight.

In contrast to the pressure measuring head shown in FIG. 1, pressure measuring head 1 shown in FIG. 2 has two optical waveguides 10 that are held in pressure measuring head 1 by a sleeve 4. The first (input) optical waveguide guides light from a light source (not shown) into pressure measuring head 1. In this preferred embodiment of the present invention, the second (output) optical waveguide picks up a portion of the light reflected by inside surface 8 of the diaphragm and guides it to a detector (not shown).

Figure 3:
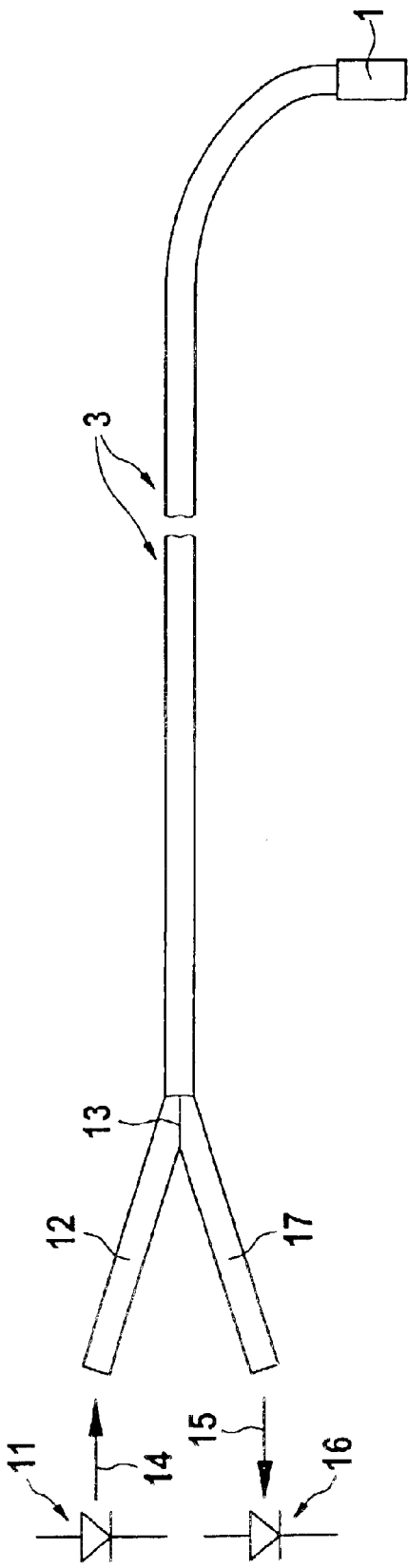
FIG. 3 shows the schematic construction of a fiber-optic pressure sensor according to the present invention having an optical waveguide.

FIG. 3 shows the schematic construction of an embodiment of a fiber-optic pressure sensor according to the present invention.

Pressure measuring head 1 is located at one end of an optical waveguide 3. A light source 11, a light emitting diode (LED) in this preferred embodiment of the present invention, emits light 14, which is guided from a first optical waveguide 12 via a Y-coupler 13 into optical waveguide 3 connected to pressure measuring head 1. In the embodiment of the pressure sensor according to the present invention shown in FIG. 3, pressure measuring head 1 is designed as in FIG. 1, for example. In this preferred embodiment of the present invention, the optical waveguide picks up a portion of the light reflected by the patterned inside diaphragm surface (not shown) and guides it via Y-coupler 13 and second optical waveguide 17 to a detector (16), a photodiode in this case. The intensity ratio of emitted light 14 to detected light 15 is a measure of the pressure present at pressure measuring head 1. It is possible to determine the value of the pressure to be measured using a pressure-intensity ratio characteristic, which has been determined for the pressure sensor.

In another preferred embodiment (not shown), light source 11 is a laser. Preferably, optical waveguide or optical waveguides 3, 12, 17 are monomode fibers.

Figure 4:
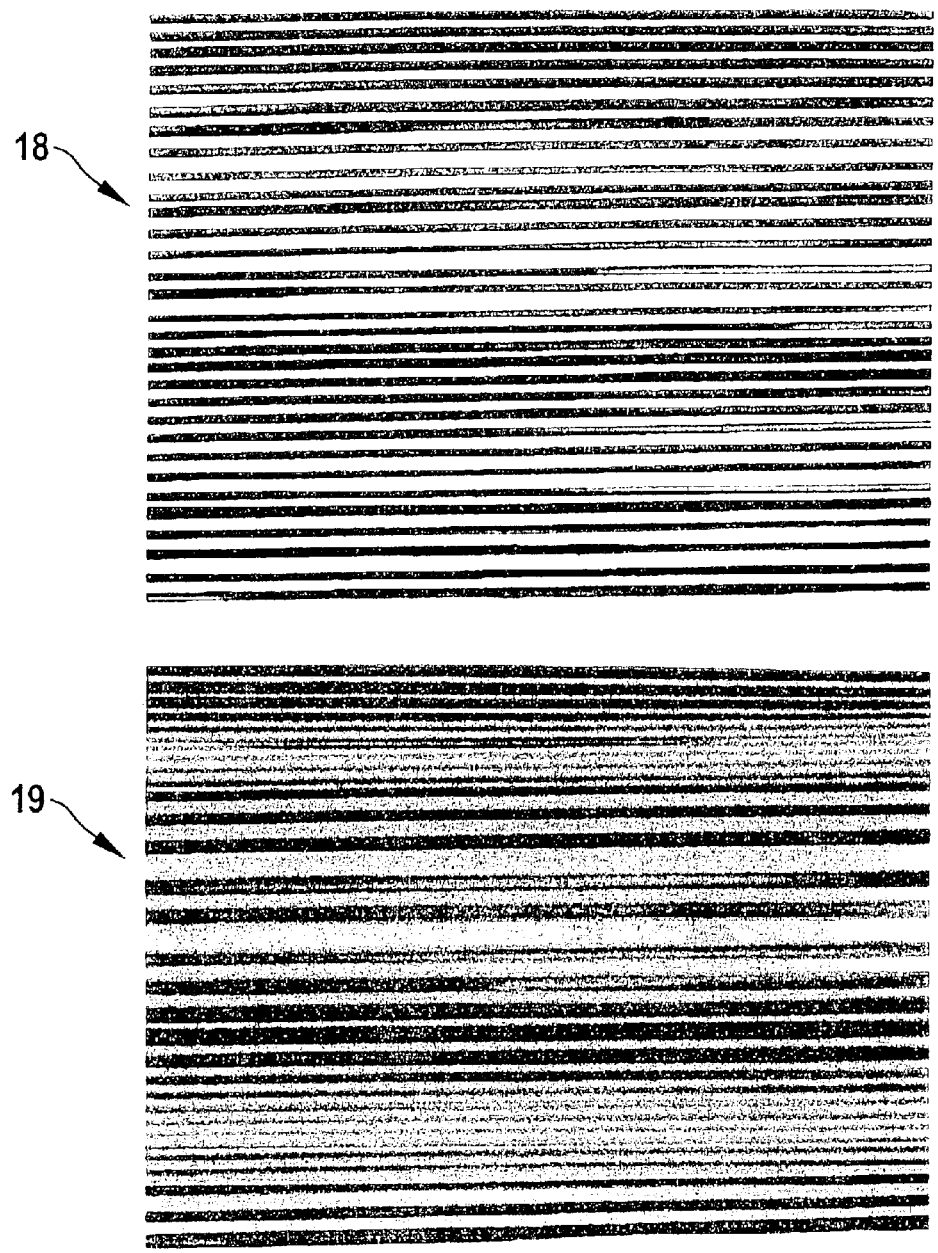
FIG. 4 shows the image reflected by a striped diaphragm of a pressure sensor according to the present invention without and with application of pressure.

FIG. 4 shows the image reflected by a striped diaphragm of a pressure sensor according to the present invention without and with application of pressure.

The upper portion of FIG. 4 shows reflected stripes 18 with a non-deflected diaphragm (without application of pressure); the lower portion shows reflected stripes 19 with a deflected diaphragm (with application of pressure). In this preferred embodiment of the present invention, the inside diaphragm surface in the pressure sensor according to the present invention alternatingly has highly reflective stripes and stripes of lower reflectivity. When light is beamed onto the striped inside diaphragm surface in the upper portion of FIG. 4, the highly reflective stripes produce bright reflected stripes. The stripes of low reflectivity reflect only a small portion of the beamed light and therefore appear as dark stripes. When pressure is applied, the diaphragm is deflected so that the highly reflective stripes reflect a smaller portion of the beamed light in the direction of observation. For that reason, the bright stripes in the upper part of FIG. 4 appear darker in the lower part. Moreover, the stripes of lower reflectivity widen when the diaphragm is deflected so that the dark stripes from the upper part are widened in the lower part. Consequently, they occupy a larger area on a surface of the same size than without the application of pressure. These two effects of diaphragm deflection on the stripes of different reflectivity result in a measurable intensity change even if the diaphragm of the pressure sensor according to the present invention is deflected only slightly. In a preferred embodiment of the present invention, the stripes of low reflectivity are wider than the highly reflective stripes. This results in high sensitivity to a (pressure-induced) deflection of the diaphragm.

In a preferred embodiment of the present invention (not shown) having a striped inside diaphragm surface, the stripes of low reflectivity are wider than the highly reflective stripes. Consequently, the effect of a diaphragm deflection on the intensity measured by the detector is even greater than with equal stripe width so that the pressure sensor responds even more sensitively to a pressure change.

LIST OF REFERENCE NUMBERS

1 Pressure measuring head
2 Housing
3 Optical waveguide
4 Sleeve
5 Cavity
6 Diaphragm
7 End of the optical waveguide
8 Inside/surface of the diaphragm
9 Outside/surface of the diaphragm
10 Two optical waveguides
11 Light source
12 First optical waveguide
13 Y-coupler
14 Emitted light
15 Detected light
16 Detector
17 Second optical waveguide
18 Reflected stripes with diaphragm not deflected
19 Reflected stripes with diaphragm deflected

What is claimed is:

1. A fiber-optic pressure sensor comprising:
   a pressure measuring head including a housing and a diaphragm, the housing accommodating the diaphragm, the diaphragm functioning as a pressure transducer that completes a translational movement under applied pressure, the diaphragm having an inside surface having a pattern made up of highly reflective areas and areas of low reflectivity; and
   at least one optical waveguide having an end face directed to the inside surface of the diaphragm and via which light emitted by a light source is introduced into the pressure measuring head.

2. The fiber-optic pressure sensor according to claim 1, wherein the diaphragm inside surface alternatingly has highly reflective stripes and stripes of low reflectivity.

3. The fiber-optic pressure sensor according to claim 1, further comprising a Y-coupler and an additional optical waveguide, and wherein the optical waveguide picks up a portion of the light reflected by the inside surface of the diaphragm and guides it via the Y-coupler and the additional optical waveguide to a detector.

4. The fiber-optic pressure sensor according to claim 1, further comprising an additional optical waveguide ending in the pressure measuring head, the additional optical waveguide picking up a portion of the light reflected from the inside surface of the diaphragm and guiding it to a detector.

5. The fiber-optic pressure sensor according to claim 1, wherein the light source is a laser.

6. The fiber-optic pressure sensor according to claim 1, wherein the light source is a light emitting diode.

7. The fiber-optic pressure sensor according to claim 1, wherein the diaphragm contains at least one of the following materials: a metallic material, a semiconductor material, a non-rusting steel, and a silicon nitride.

8. The fiber-optic pressure sensor according to claim 2, wherein the stripes of low reflectivity are wider than the highly reflective stripes.

9. The fiber-optic pressure sensor according to claim 1, wherein the at least one optical waveguide includes mono-mode fibers.

10. A spark plug for a spark-ignition internal combustion engine comprising:
    a built-in fiber-optic pressure sensor including a pressure measuring head and at least one optical waveguide, the pressure measuring head including a housing and a diaphragm, the housing accommodating the diaphragm, the diaphragm functioning as a pressure transducer that completes a translational movement under applied pressure, the diaphragm having an inside surface having a pattern made up of highly reflective areas and areas of low reflectivity, the pressure measuring head being situated at one end of the spark plug such that the diaphragm is directly exposed to a pressure in a cylinder of the internal combustion engine, the at least one optical waveguide having an end face directed to the inside surface of the diaphragm and via which light emitted by a light source is introduced into the pressure measuring head.

11. An injector for an internal combustion engine comprising:
    at least one built-in fiber-optic pressure sensor for measuring at least one of a pressure in a combustion chamber of the engine and a fuel pressure, the at least one pressure sensor including a pressure measuring head and at least one optical waveguide, the pressure measuring head including a housing and a diaphragm, the housing accommodating the diaphragm, the diaphragm functioning as a pressure transducer that completes a translational movement under applied pressure, the diaphragm having an inside surface having a pattern made up of highly reflective areas and areas of low reflectivity, the at least one optical waveguide having an end face directed to the inside surface of the diaphragm and via which light emitted by a light source is introduced into the pressure measuring head.

* * * * *